Patented Jan. 23, 1940

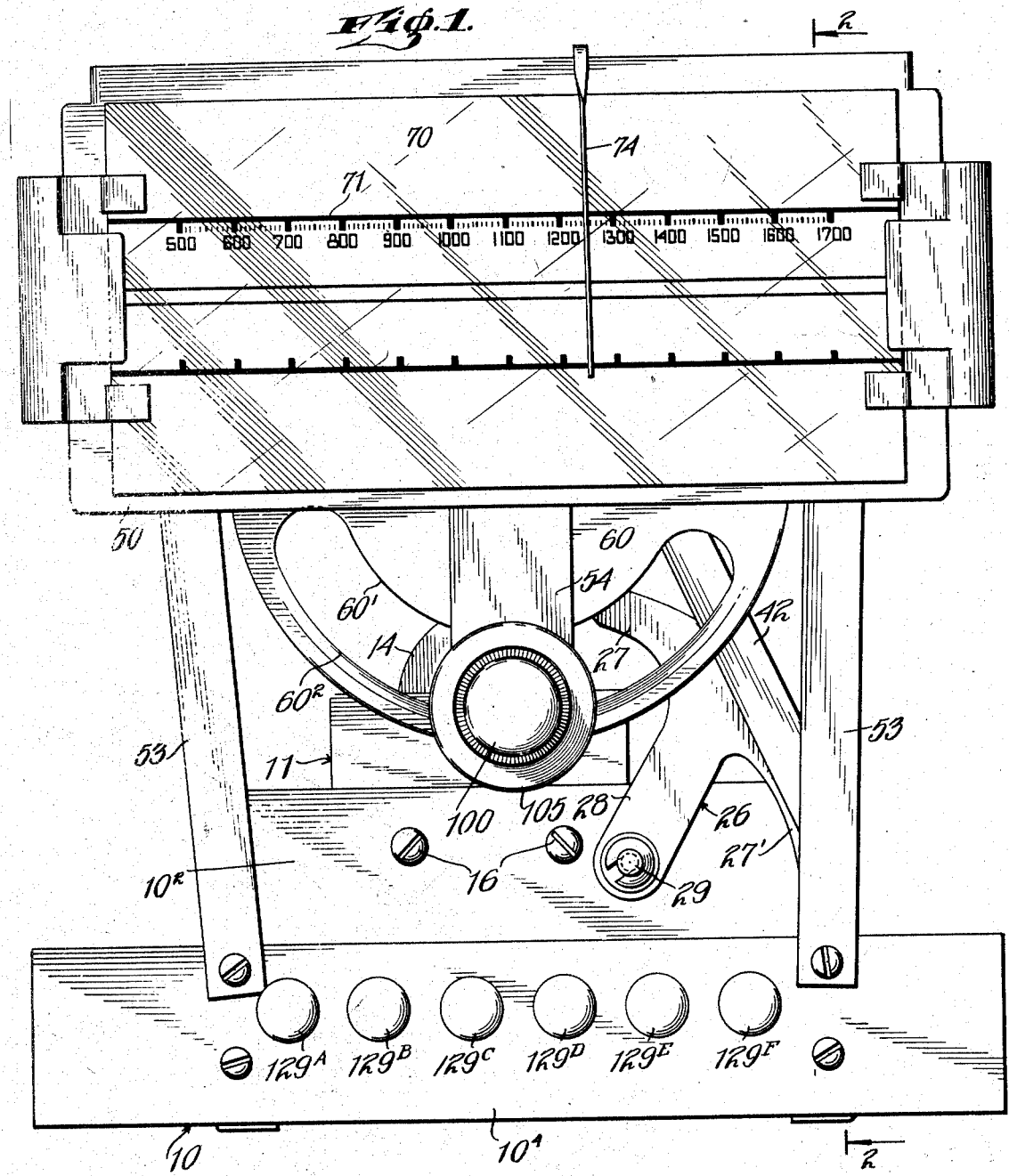

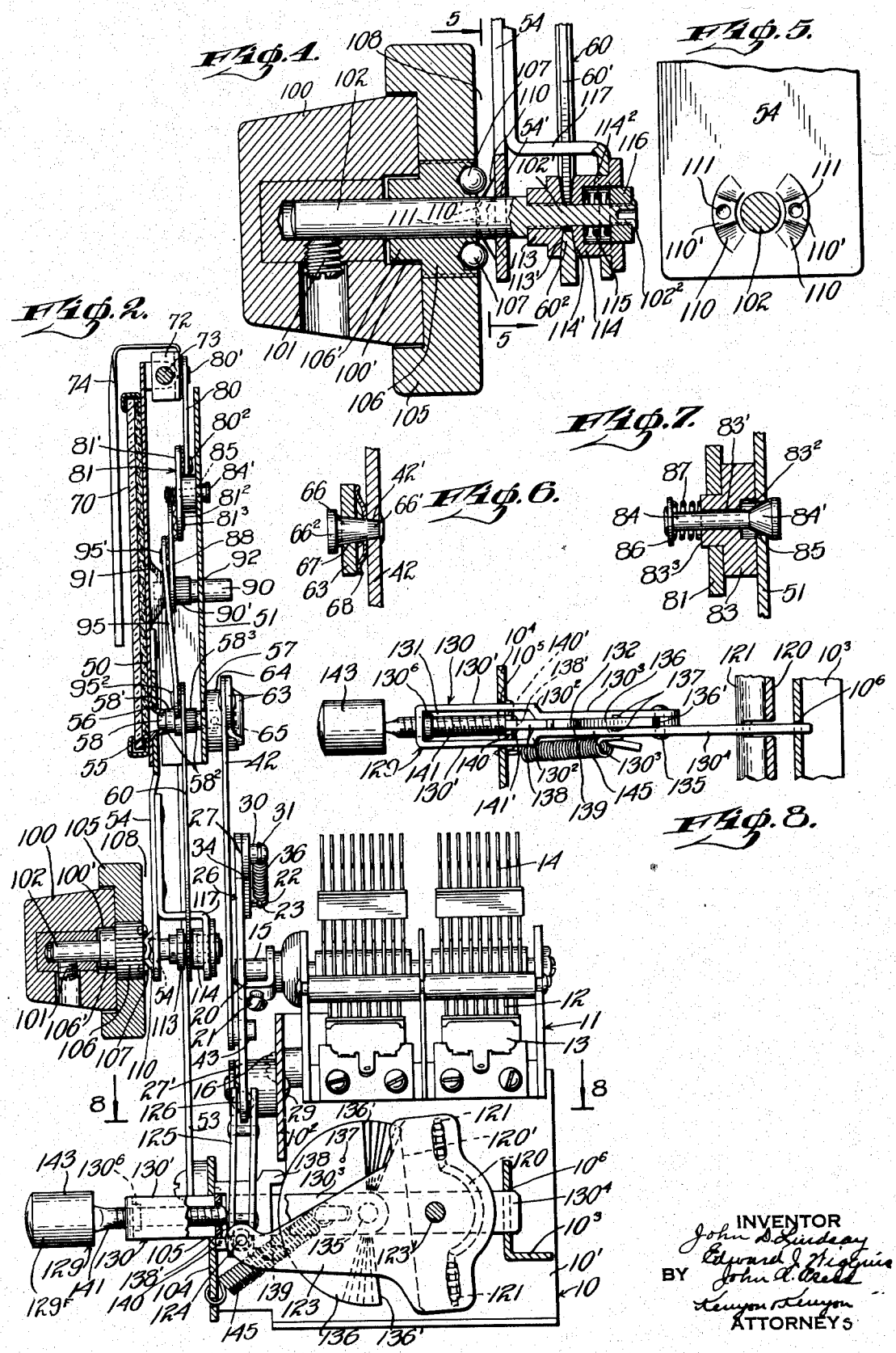

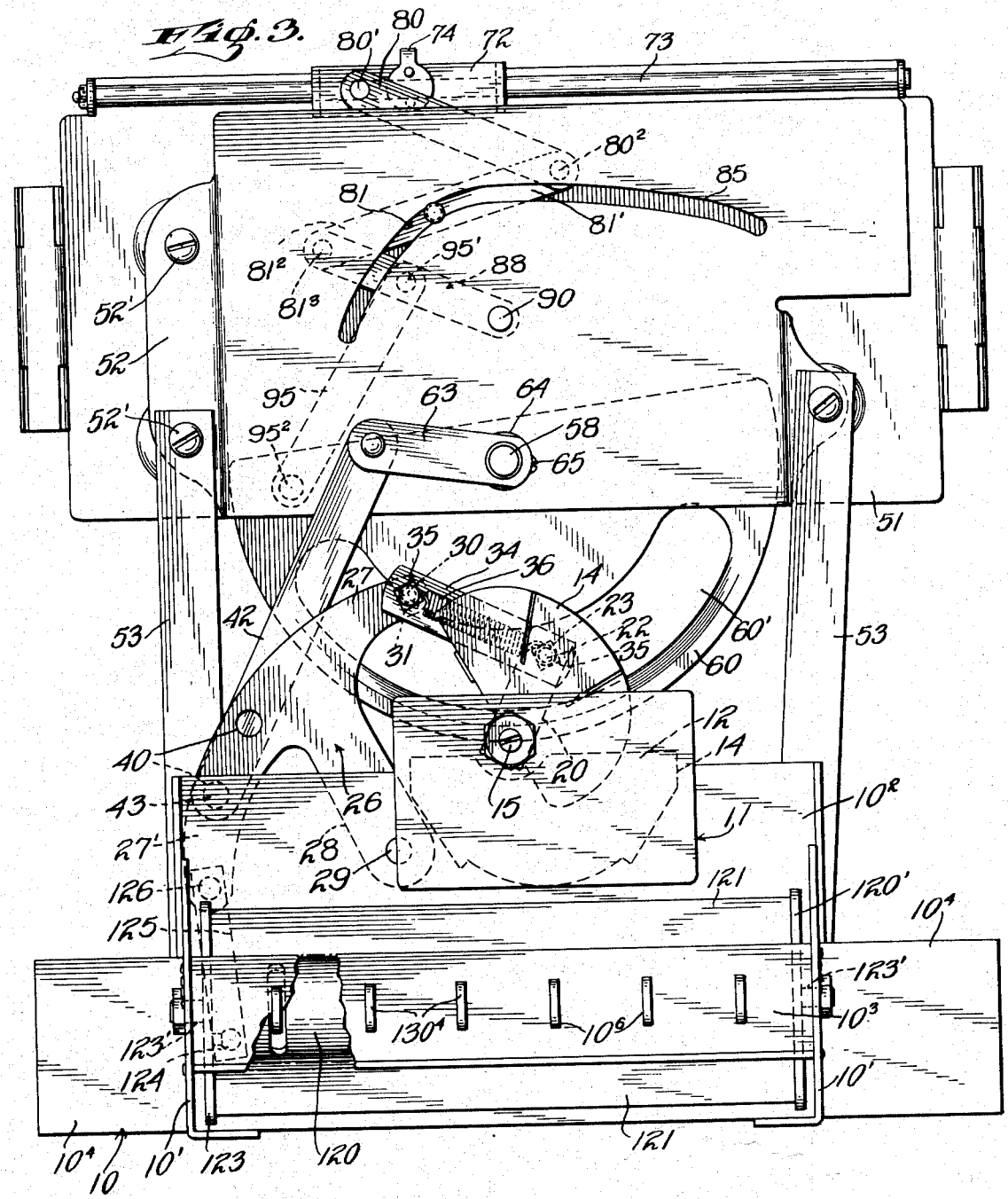

2,188,136

UNITED STATES PATENT OFFICE 2,188,136

VISUAL TUNING INDICATOR

John D. Lindsay, Wilmette, and Edward J. Wiggins and John A. Press, Chicago, Ill., assignors to American Emblem Company, Inc., New Hartford, N. Y., a corporation of New York Application February 21, 1939, Serial No. 257,646

15 Claims. (Cl. 116—124.1)

The present invention relates to tuning devices for electrical mechanisms and more particularly to dialing mechanisms and automatic station selector devices for radio and television receivers.

Modern radio receiving sets are tuned in on the wave length of any given broadcasting station by varying either the inductance or the capacity in the tuning circuits. The majority of receiving sets are tuned by varying the capacity of variable condensers in the tuning circuit.

In the past calibrated circular dials and co-operating circular indicator disks have been used for tuning purposes. The circular dial system has proven unsatisfactory because of the difficulty of precision calibration on the dial, the difficulty of accurately reading such a dial as well as the difficulty of so adjusting the ratio of rotation between the dialing knob and the disc upon which the indicator is attached so that manual precision tuning may be effected.

Consequently manufacturers have generally begun to discard the circular type of tuning dial and have adopted in its place the straight line dial, either vertical or horizontal type. In doing so, however, they have encountered many mechanical difficulties and problems which to date so far as we are aware have had no effective and satisfactory solution. They commonly now use what is known as a straight line type of condenser wherein roughly speaking a graph drawn of the angular change in direction of the revolving portion of the condenser relative to the capacity change should be along a straight line. Unfortunately, however, this does not work out accurately in practice. For example, if the first ten degrees rotation of a given straight-line condenser rotor gives a change in wave length from 500 kilocycles to 600 kilocycles, it may nevertheless develop that the next ten degrees of rotation will reflect a change of from 600 kilocycles to but 690 kilocycles instead of to 700 kilocycles. As a result, it has been necessary to calibrate the dial unequally to compensate for the deviation from a straight line graph. No means so far as we are aware have heretofore been found whereby the calibrations on the dial could be made equidistant from each other and simultaneously compensate for the straight line deviation noted.

Furthermore, even after overcoming the difficulty of proper calibration of the dial, further trouble has been encountered in effecting an accurate means of moving the indicator along the dial in precision synchronization with the movement of the condenser. The most common dialing mechanism heretofore in use has been that adopting a circular drum attached to the axis of the condenser together with pulleys and a piece of fish line or other similar substance. The fish line after being wound once around the outside edge of the circular drum is then extended to the axis of the tuning knob, is then extended to a pulley located at the top of the back of the dial, then around this pulley and along the top of the back of the dial to another pulley located at the other end of the top of the back of the dial, and thence back to the revolving drum where both ends of the fishline are attached to a spring which holds the line taut. There is then attached to that part of the fish line extending between the two pulleys at the top of the back of the dial an indicator adapted to move across the face of the dial. When the tuning knob is rotated the fish line then causes the revolving drum to rotate which in turn rotates the condenser and at the same time moves the indicator correspondingly along the face of the dial. The ratio of the rotation of the tuning knob to the condenser and of the consequent movement of the indicator along the dial is governed by the ratio of the circumference of the axis of the tuning knob to the circumference of the drum, which in turn governs the length of the dial itself. This method of tuning and of dialing has proven most unsatisfactory in operation for several reasons:

(1) Every set of dials used by the manufacturer must be calibrated in advance to meet the deviations of the particular type of condenser which the manufacturer uses.

(2) Changes in lengths of dials require a corresponding change in drum diameters.

(3) The fish line assembly on the dialing mechanism must be done by hand and requires a disproportionate amount of time and considerable skill on the part of the worker.

(4) The fish line itself is subject to breakage, deterioration, stretching, slippage and misalignment which requires replacement and frequent readjustment which can only be done properly at the factory or by a skilled worker. Sudden strain, particularly in so-called automatic tuning, results in straining or stretching of the fish line which then requires readjustment.

(5) Since use of a fish line requires a rotating element for operation, it can only be conveniently used with a rotating type of condenser.

It is a principal object of our invention to provide dialing mechanism which eliminates every one of the objectionable features hereinabove enumerated in connection with ratio, television or any other electric dialing or tuning.

It is another object of our invention to provide dialing mechanism in which no string, no fish line, no belts, no gears, no pulleys and no operating springs are required. Thus all possibility of slippage, lost motion, or play is eliminated, thereby assuring accuracy and reducing friction and wear.

Another object of our invention is to employ a series of levers positively connecting and coordinating the dialing knob, the condenser or other tuning means, and the indicator each with the other. As a result our invention is readily adaptable to any type of condenser, transformer or other electrical tuning means now used or known. The desired ratio between the rotation of the tuning knob and the maximum degree of rotation of any revolving type of condenser, whatever it may be, is readily maintained and the mechanism may easily be adapted to any condenser employing a larger or smaller maximum degree of rotation by simply changing the fulcrum of one lever thereby relatively increasing or decreasing the lengths of the arms of another. The mechanism employs no rotating drum and consequently the length of travel of the indicator itself is not governed or limited by the size of any such drum. It permits the use of a straight dial, whether vertical or horizontal, of any desired length; the dial may be calibrated either into equal or unequal calibrations or segments as may be found desirable; and both the length of the dial and the system of calibration used is wholly independent of the type of transformer or condenser which may be adopted. Furthermore since there is direct and positive connection between both the tuning knob, the condenser or other tuning means and the dial indicator itself the possibility of inaccurate dialing due to lost motion, wear, slippage, strain or maladjustment is wholly eliminated and precision dialing is assured. This feature of positive connection and coordination renders it especially satisfactory and desirable for automatic dialing as well as manual dialing since its adjustment cannot be destroyed or varied by the sudden strain which automatic tuning involves.

It is another principal object of our invention therefore, to provide dialing means which is capable of use advantageously either for manual or automatic dialing and to provide means to permit either said manual or automatic dialing at will.

A further object of our invention is to provide means in our dialing mechanism which will insure a continuation of precision movement of the dial indicator with relation to the condenser or other tuning means regardless of wear or continued usage.

Another principal object of our invention is the provision of means for speeding up or slowing down the travel of a dial indicator with relation to the travel of a condenser or other tuning unit, and also means of coordinating the indicator at any position on a given dial with the travel of the condenser or other tuning unit along a straight line so that where for example, there is 180 degrees of travel of the condenser or tuning unit there will be 180 equal or unequal divisions on the dial but the position of the dial in degrees will always correspond with a given position of travel of the condenser or other tuning unit.

To the accomplishment of the foregoing and such further objects as may hereinafter appear, this invention comprises the novel construction, combination and arrangement of parts hereinafter described and then sought to be defined in the appended claims, reference being had to the accompanying drawings forming part hereof, which show, merely for the purposes of illustrative disclosure, a preferred embodiment of our invention, it being expressly understood, however, that various changes may be made in practice within the scope of the appended claims without digressing from our inventive idea.

In the drawings, in which similar reference characters denote corresponding parts:

Fig. 1 is a front elevation of our novel dialing mechanism embodying both means for manual and for automatic dialing;

Fig. 2 is a vertical section taken along line 2—2 of Fig. 1 and viewed in the direction of the arrows;

Fig. 3 is a rear elevation of the device of Fig. 1;

Fig. 4 is an enlarged sectional detail of the novel coupling means for coupling or uncoupling the manual tuning knob;

Fig. 5 is a vertical section taken along line 5—5 of Fig. 4 and viewed in the direction of the arrows;

Fig. 6 is an enlarged vertical sectional detail of our novel lever mounting means which serves to compensate for wear during use of our device;

Fig. 7 is an enlarged vertical sectional detail of the means for speeding up or slowing down the speed and distance of travel of the dial indicator; and Fig. 8 is a partial section taken along line 8—8 of Fig. 2 illustrating one of the automatic tuning plungers.

Referring to the drawings, 10 denotes a chassis or frame which supports the tuning condenser 11 and the major portion of the automatic tuning elements to be presently described. The condenser 11 is of the usual well known straight line type comprising the stator plates 12 mounted in a stator frame 13 and the rotor plates 14 mounted on a rotatable shaft 15. The latter may be rotated through an arc of substantially 180° i. e., from a position of said rotor plates giving maximum condenser capacity to a position of said rotor plates giving minimum condenser capacity.

The chassis or frame 10 comprises two end plates 10′ provided with set-backs. These end plates 10′ are joined at their set-back vertical edges by a transversely extending horizontal plate 10² and in their rear by a transversely extending, horizontal, vertically slotted plate 10³. The end plates 10′ are also suitably joined at their extreme forward edges by the transversely extending horizontal plate 10⁴ which has the plurality of perforations 10⁵ in axial alignment with the corresponding slots 10⁶ in the plate 10³.

Stator frame 13 is suitably supported as at 16 from the plate 10² and the rotor shaft 15 projects forwardly of and above the said plate 10².

A lever 20 is adjustably coupled at one end to the rotor shaft 15 by a set screw 21. The free end of this lever has attached thereto a laterally projecting coupling pin 22 provided with an annular groove 23 for a purpose to be presently described. A T-shaped crank 26 whose cross arm 27 is arcuate in shape is pivotally supported in its vertical arm 28 from the plate 10² as at 29. One of the ends of the cross arm is provided with a laterally extending pin 30 having an annular groove 31. A connecting link 34 having enlarged perforations 35 at its opposite ends is loosely mounted on the pins 23 and 30 serving to link the lever 20 to the crank 26. A coil tension spring 36 attached at its ends in the grooves 23 and 31 of pins 22 and 30 serves to urge the pins towards each other in the link perforations 35. It has sufficient tension to normally maintain this position of the pins. During tuning of the condenser and particularly during automatic tuning the rotor shaft is subject to sudden changes in position. If, therefore, the link 34 had no play, as is herein provided, the sudden shift in position would be likely to cause a change of position of the lever 20 relative to the rotor shaft 15 notwithstanding the set screw 21. However, the play permitted by the spring actuated slackly connected link 34 acts as a shock absorber which eliminates the danger of the apparatus going out of adjustment.

The opposite leg 27' of arm 27 is provided with several perforations 40 along the arc of a circle whose center is the axis of pivot point 29. A connecting link 42 having a laterally extending pivot pin 43 at one end removably mountable in one of said perforations 40 serves to connect the crank 26 with the tuning mechanism now to be described.

This tuning mechanism comprises an open frame having front and back plates 50 and 51 respectively. Back plate 51 is suitably spaced from and attached to the front plate 50 by inwardly and laterally extending flanges 52 and the bolts 52'.

The open frame is suitably supported from the horizontal plate 10⁴ of the chassis frame by supports 53 attached to plate 10⁴ and to bolts 52'.

Rigidly supported from the inner face of the front plate 50 and extending downwardly therefrom in vertical direction is the manual tuning control support 54. The latter is provided at its upper inner face with an opening 55 into which extends a bearing 56 formed on the plate 50. The rear plate 51 has an opening 57 in axial alignment with the bearing 56 and a shaft 58 is rotatably borne in the bearing and said opening extending through plate 51 to its opposite side. Between the plates 50 and 51 the shaft 58 is enlarged in diameter at 58' forming shoulders 58² near its opposite ends so that it cannot slide longitudinally in bearing 56 or opening 57. A portion of shaft 58' is provided with a key way 58³ and an arcuate plate 60 is keyed to said shaft in the key way and adapted to rotate with said shaft. A crank lever 63 is adjustably attached to shaft 58 by means of a collar 64 attached to the crank lever and by set screw 65. The free end of lever 63 is pivotally but permanently attached to the link 42 in the following manner.

A tapered pin 66 (Fig. 6) corrugated at its narrower end and 66' headed at its broader end 66² is inserted through a tapered opening 67 in the lever 63. Then a spring washer 68 is mounted on the pin over its narrower end and thereafter the said narrower end is driven into and riveted in the opening 42' in the link 42. The spring washer is normally partially compressed and tends to urge the lever 63 toward the thicker end of said pin 66. Thus as the pin 66 and the material about the opening 67 wear during use, the lever is moved by the spring washer onto a thicker portion of the pin, which thus serves to take up play or lost motion which would otherwise result from wear of the parts during use. This means of joining the pivoting levers is employed wherever feasible in the mechanism in order to insure a continuation of precision movement of the dial indicator to be presently described with relation to the condenser or other tuning means regardless of wear induced by continued, frequent usage.

The dial used with my device comprises a dial plate 70 suitably supported from the front face of the frame plate 50. The dial plate may be calibrated into suitable graduations or divisions 71 over the frequency range or ranges in which the radio set is designed to operate. A carriage 72 slidably mounted on a slide bar 73 suitably carried by the frame plate 50, has a vertically extending indicator 74. This indicator is movable reciprocably over the graduations 71 in synchronism with the rotation of the rotor plates 14 and serves to indicate their tuning positions on the calibrated divisions either in angular degrees, kilocycles or the like depending upon the scale and markings associated with the graduations.

Synchronous movement of the indicator 74 and rotor plates 14 is effected as follows: A link 80 has one end pivotally connected to the carriage 72 at 80' with the same type of tapered pins and spring washer connection heretofore described and illustrated in detail in Fig. 6. The opposite end of link 80 is similarly pivotally connected at 80² to one arm 81' of a lever 81. Lever 81 intermediate its ends has a laterally extending bearing block 83 (see Fig. 7). This bearing block which is fixed to said lever 81 has a bore 83' enlarged at its forward end 83². A pin 84 having a tapered head 84' is adapted to be inserted through the bore 83' from the opposite face of plate 51 through a cam groove 85 to be presently described, and held in position in the bore 83' by a removable collar 86 at the inner end of said pin, a compression spring 87 being mounted around said pin between said collar and the inner end 83³ of said block 83. In this manner a tight slidable engagement of the head 84' of the pin in groove 85 under the action of spring 87 always is insured notwithstanding wear of the edges of the groove 85 or the pin head 84' during long continued usage. If desired a straight pin fixedly mounted in the block 83 and extending into and operating in cam groove 85 with close tolerance can be substituted for pin 84. However the wear compensating pin 84 is preferable.

The opposite arm 81² of the lever 81 is pivotally connected at 81³ to one end of the crank lever 88 whose other end is keyed at 90' to the rotatable shaft 90 rotatably borne in the bearing 91 extending from the inner face of plate 50 and the axially aligned perforation 92 in the plate 51. The pivotal connection 81³ is the same type of wear compensating connection heretofore described and illustrated in Fig. 6.

A connecting link 95 is pivotally attached at one end 95' to a point intermediate the ends of lever 88 with the same type of wear compensating connection. The opposite end of the link 95 is similarly connected at its other end 95² to the driving plate 60 in such a way that through the levers and groove and linkages rotation of the arcuate plate 60 in one direction will cause transverse movement of the slide and indicator across the graduations on the dial plate 70 in the same direction as the rotor plates 14 are turned. As viewed from the direction of Fig. 3, clockwise rotation of the driving plate 60 will cause clockwise rotation of the rotor plates 14 and simultaneous movement of the carriage 72 and indicator 74 from left to right through the various levers and linkages hereinbefore described, and move the carriage 72 and indicator 74 in opposite direction from right to left when the arcuate drive plate 60 is rotated counter-clockwise.

The movement of the indicator 74 is synchronized to the condenser rotor movement more particularly by the shape of the groove or guide 85 in which the pin 84 travels. This groove or guide 85 is so constructed that the position of the indicator 74 is at all times in a direct degree relation to the position of the condenser rotor or other tuning unit. Both the length and rate of travel of the indicator 74 along the dial is determined by the length and direction of the groove or guide 85 in which the said pin or lug 84 travels. The curve of the groove or guide can be changed to give closer or wider spacing in any part of the travel course of the indicator. By this means, not only is any variation in the straight line graph of the condenser or other tuning unit compensated for so that the dial itself may be marked off in uniformly equal calibrations, but also, if it is desired, where many stations come in close together, that the spacing on the dial be lengthened in this area, it can be done by changing the curve of said groove or guide. When we speak of groove or guide, its equivalents, viz., track, slot, cam or the like are contemplated.

The driving plate 60 is adapted to be rotated manually by the tuning knob 100. This tuning knob is adjustably attached by set screw 101 to a rotatable, longitudinally slidable shaft 102. The latter is rotatably borne in the opening 54' in support 54. Rotatably carried on the shaft 102 between support 54 and the tuning knob 100 is a clamping ring 105. This ring has a central bushing 106 which on its front end is reduced in diameter at 106' and extends into a recess 100' in the knob 100. The opposite end of the bushing is provided with two diametrically spaced balls 107 or the like suitably fixed in the bushing and which project into the space 108 between the rear face of the ring 106 and the support 54.

Two arcuate cam members 110 are mounted on the support 54 at diametrically opposite points about the shaft 102. These members have raised cam portions 110' extending into the space 108 and toward the ring 105. Each raised portion is provided with a depression or notch 111 to receive one of the balls 107 for a purpose to be presently described.

The forward end of shaft 102 is reduced in diameter at 102' and has keyed thereon a clutch ring 113 whose rear face 113' is conical. The shaft 102 also extends slidably and rotatably through a second clutch ring 114 whose front face 114' is coned in opposite direction to face 113'. A compression spring 115 is mounted around the shaft 102' in a recess 114² behind the face 114' of the second clutch ring and a retaining collar 116 is mounted on the shaft end and held in place, for example, by turning or flaring over the inner shaft end at 102². Clutch ring 114 is carried in axial alignment with opening 54' and spaced therefrom by a bracket 117 suitably carried from the support 54.

The arcuate driving plate 60 has an extended arcuate slot 60' through which the shaft 102' and the bracket 117 project. The lower edge 60² of the slot 60' is somewhat tapered and extends between the coned faces 113' and 114' of the two clutch rings 113 and 114. The normal action of compression spring 115 against the collar 116 causes clutch ring 113 to bear tightly against the edge 60² so that when said ring is rotated upon rotation of the dial knob 100, there is sufficient friction between the face 113' and said edge 60² to cause the latter to be moved with corresponding rotation of the arcuate plate or disk 60. As a result the condenser rotor 14 and the indicator 74 are also moved through the agency of the levers and links hereinbefore described. Rotation of the clamping ring 105 so that the balls 107 ride up and are caught in the depressions or grooves 111 of the cam members 110 causes axial displacement of the ring 105, the knob 100, the shaft 102 and the clutch ring 113 against the action of spring 115 to free the edge 60² of the disk 60. As a result the latter is released and free to be moved by the automatic tuning equipment now to be described. At the same time the tuning knob 100 is frictionally held against free rotation by tight engagement with the front face of the ring 105. Re-engagement of the manual tuning system with the arcuate disk 60 is effected simply by rotating the release ring 105 so that the balls ride off the raised portions 110' of the cams 110.

The structure hereinbefore described permits ready attachment of automatic tuning means. To this end, a concave member 120 extending transversely between the end plates 10' of the chassis or frame 10 is provided. This concave member has oppositely-extending flanges 121 in a substantially diametrical plane which serve as cam surfaces in a manner to be presently described. One end of the concave member is provided with an end plate 120' which is pivoted to one end plate 10'. Suitably fixed to the other end of the member 120 and extending in a plane normal to the flanges 121 is a lever 123. This lever is fulcrumed at 123' to the other end plate 10', the fulcrum serving as the center of rotation of the concave member 120. This lever 123 is also connected by a universal joint connection at 124 to a link member 125 whose opposite end is attached to the cross arm 27' of the T shaped member 26 by a universal joint at 126. In this manner rotation of the concave member 120 will cause corresponding rotation of the rotor plates 14 through the agency of the lever 123, connecting link 125, T shaped member 26, link 34 and lever 20. Simultaneously rotation of concave member 120 will cause corresponding movement of the indicator 74 through the agency of lever 123, connecting link 125, T shaped member 26, link 42, lever 63, arcuate disk 60, link 95, lever 88, link 81, groove 85, link 80 and slide 72. The degree of angular rotation of the concave member 120 is so admeasured as to be sufficient to effect 180° rotation of the rotor plates 14, through the linkages and levers hereinbefore described.

Automatic means for rotating the member 120 through any desired number of degrees intermediate its limiting positions is provided. This means comprises a plurality of plunger members 129 guided in the perforations 10⁵ of the horizontal plate 10⁴ and the slots 10⁶ in the horizontal rear plate 10³ of the chassis 10, and extending through vertical slots in the concave member 120. Each plunger member comprises a U shaped frame 130 whose side legs 130' extend parallel to each other to define a space 131 and are then bent inwardly toward each other at 130² and, then extend parallel to each other at 130³ to define a second smaller space 132. One of the legs of said frame at 130⁴ is longer than the other leg and projects through a vertical slot in the concave member 120 and a vertical slot 10⁶ in the plate 10³.

Pivotally supported at 135 from the leg portions 130³ in the space 132 is a semi-circular disc 136. This disc is provided with suitable laterally projecting stops 137 which are engageable with the leg portions 130³ and serve to limit rotation of the disc to a desired number of angular degrees. In the embodiment shown, the limits of rotation are substantially 60 degrees apart. This disc is adapted to be locked in any adjusted position between its limits of rotation by a locking member 138 slidably movable toward and away from the circumferential edge of the disc 136. The member 138 in the embodiment shown has the forwardly projecting noses 139 which are adapted to frictionally engage the said disc edge and lock the disc against rotation when pressed thereagainst. At its rear the locking member has a transversely extending guide plate 140 slidably movable in the space 131. The locking member is adapted to be tightened against the disc by the bolt 141 threaded in a nut carried in the frame 130 at 130⁶. The forward end 141' of the bolt extends through an opening 140' in the guide plate 140 and bears against the rear edge 138' of the locking member so that when the bolt is screwed inwardly, it forces the locking member against said circumferential edge of said disc 136 to lock the latter in its adjusted angular position. A suitable finger knob 143 is carried on the forward end of the bolt. The entire plunger 129 is reciprocally slidable transversely of the plates 10⁴ and 10³. Tension spring 145 suitably attached at its ends to the plate 10⁴ and to the frame 130 serves continuously to urge the plunger outwardly so that its guide plate 140 abuts the inner face of the plate 10⁴. Pressure of the plunger inwardly against the action of the spring causes the diametrical edges 136' of the semi-circular disk to engage one or the other of the flanges 121 of the concave member 120 and to rotate the latter into such position that both flanges are in directional alignment with the said diametrical edges 136'. The rotation of member 120 causes the rotor plate rotation and indicator movement as hereinbefore described through the levers and links. A change in angular adjustment of the disk 136 results in a change of angular position of its diametrical edges 136'. As a result a corresponding change in the ultimate angular position of the concave member 120 also is effected when the plunger is moved inwardly.

A plurality of identically constructed plungers 129 are provided, six 129A–129F being shown in the present embodiment. The corresponding disc 136 of each may be adjusted to a different angular position. As a result each plunger will always rotate the concave member 120 to an angular position corresponding to the setting of its individual disc 136. The springs 145 normally retract the plungers 129 so that then discs 136 are entirely clear of the concave member 120. Thus when an individual plunger 129 is pressed inwardly only its disk 136 acts upon the concave member 120 without interference from the other discs. At the completion of the particular plunger stroke, and during which the concave member has been given a definite angular rotation by the particular disk 136, the plunger is retracted by its spring 145, its disk 136 moving away from the said concave member which, however, remains in its angularly adjusted position.

In this way, any one of the plungers upon being moved inwardly will always cause a rotation of the concave member 120 either clockwise or counterclockwise depending upon its position, to bring it into a position corresponding to that of the particular disk 136 on the particular plunger moved inwardly. For example, if plunger 129B has its disk 136 so adjusted as to rotate the concave member 120 to an angle of 15° with the vertical, plunger 129C has its disk 136 so adjusted as to rotate the concave member 120 to an angle of 45° with the vertical and plunger 129F has its disk 136 so adjusted as to rotate the concave member 120 to an angle of 30° with the vertical, pressure inwardly of plunger 129B will give the desired 15° inward rotation to the member 120. Thereafter pressure inwardly of plunger 129C will give the member 120 an additional rotation of 10° so that the net rotation of the latter would be 25° from its starting position. Likewise pressure inwardly of plunger 129F would now rotate the member 120 an additional 5° so that its net movement from its starting position would be 30°. Pressure now of plunger 129B would cause the concave member to be rotated in opposite direction over an angle of 15° so that its final position would be at a position 15° with the vertical starting position. In other words pressure inwardly of any one of the plungers 129A–129F will always rotate the disk 120 to the angular position with the vertical defined by the diametrical edges 136' of its particular semicircular disk 136.

Coordination between the manual tuning and automatic tuning means is effected as follows:

The releasing ring 105 is so rotated as to permit frictional engagement of the arcuate plate 60 between the clutch rings 113 and 114 at which time manipulation of the tuning knob 100 will cause corresponding movement of both the rotor plates 14 and the indicator 74 through the agencies of the levers and links hereinbefore described. The set is then tuned by the movement of the knob 100 to a particular station. When a particular station has been tuned, the release ring 105 is rotated to automatic tuning position, i. e. to disengage the arcuate plate 60 from between the clutch rings 113 to 114. Then the bolt 141 of one of the plungers 129 is loosed and the latter is pressed inwardly. Since its semicircular disk 136 is now loose, its diametrical edges 136' adjust themselves to the angular position of the flanges 121 of the concave member 120. The bolt 141 is then tightened, setting the said disc in said angular position. Thereafter inward pressure on this particular plunger 129 will always rotate the concave member 120 to the particular angular position of the flanges 121 which mate with the said angular adjusted position of the particular disc 136. Successive plungers may be similarly adjusted for other dial settings at particular stations.

Since all the plungers 129 are free and clear of the concave member 120 except when pressed inwardly, the aforementioned adjustment of the semi-circular discs 136 does not interfere with manual tuning which is done by the rotation of tuning knob 100 while the release ring 105 is in such position as to permit frictional engagement of the clutch rings 113 and 114 with the drive disc 60. During automatic tuning, the release ring 105 is rotated to cause the clutch rings 113 and 114 to separate and free the disc 60. Operation of any plunger during this release position will tune the set to the station for which the particular plunger has been adjusted. Since the individual semi-circular discs 136 are readily adjustable, any plunger may be changed to tune the set to any desired radio station by the owner of the set without requiring any alteration other than a change in position of its semi-circular disc 136. Such adaptability vastly increases the automatic tuning range which in most commercial devices has heretofore been limited to a few standard broadcasting stations.

It is understood, of course, that the proportioning of parts and degrees of rotation and movements of various of the discs, levers and links can be anything practically desirable. In the particular embodiment herein shown, the condenser rotor plates are rotatable over 180 degrees. The indicator 74 is adapted to move over a dial face a longitudinal distance corresponding to the 180 degrees angular rotation of said rotor plates. In effecting the movement, the levers and links are so proportioned that a rotation of 45 angular degrees of the arcuate disc 60 will impart a rotation of 60 angular degrees to the T-shaped arm 27. The latter in turn through the link 34 and crank lever 20 will rotate the condenser shaft 15 through 180 degrees. Likewise the 45-degree rotation of arcuate disk 60, through the link 95, lever 88, link 81, groove 85, pin 84, link 81 and carriage 72 will simultaneously move the indicator 74 over the full 180-degree length of the dial face. Furthermore, the concave member 120, which is connected to the T-shaped arm 27 through link 125, is also rotatable over a 60-degree span and full rotation within the span of this member 125 will effect the 180-degree rotation of the rotor shaft and 180-degree movement of the indicator.

A change of position of the fulcrum 43 of the link 42 by shifting it to one of the other holes 40 in the arm 27' will reduce or enlarge the range of travel of the indicator 74 without requiring any change in the other parts.

The radius of the edge 60² of the slot 60' is so admeasured that a rotation of approximately 1350 degrees of the tuning knob 100 is required to produce 180-degree rotation of the rotor shaft 15.

It is understood, of course, that the relative angular movements herein noted are simply by way of example. Alterations in angular movements to adapt the apparatus for tuning devices having more or fewer angular degrees of rotation are contemplated and within the scope of our invention.

It is also to be understood that various changes in structural details are fully contemplated as part of our invention within the scope of the appended claims. We do not therefore wish to be limited to the exact details shown and described.

We claim:

1. In electrical apparatus comprising a movable tuning unit, in combination, a driving member for moving said tuning unit, linkage means connecting said member to said tuning unit, an indicator, a dial over which said indicator is movable, linkage means connecting said member and said indicator for simultaneous movement of the latter in synchronism with the movement of said tuning unit, means for moving said driving member, and means associated with said second named linkage means for variably regulating the speed of travel of said indicator relative to the movement of said tuning unit.

2. In electrical apparatus comprising a movable tuning unit, in combination, a driving member for moving said tuning unit, linkage means connecting said member to said tuning unit, an indicator, a dial over which said indicator is movable, linkage means connecting said member and said indicator for simultaneous movement of the latter in synchronism with the movement of said tuning unit, manual means for moving said driving member, and means associated with said second named linkage means for variably regulating the speed of travel of said indicator relative to the movement of said tuning unit.

3. In electrical apparatus comprising a movable tuning unit, in combination, a driving member for moving said tuning unit, linkage means connecting said member to said tuning unit, an indicator, a dial over which said indicator is movable, linkage means connecting said member and said indicator for simultaneous movement of the latter in synchronism with the movement of said tuning unit, means for moving said driving member to a predetermined position, and means associated with said second named linkage means for variably regulating the speed of travel of said indicator relative to the movement of said tuning unit.

4. In electrical apparatus comprising a movable tuning unit, in combination, a driving member for moving said tuning unit, linkage means connecting said member to said tuning unit, an indicator, a dial over which said indicator is movable, linkage means connecting said member and said indicator for simultaneous movement of the latter in synchronism with the movement of said tuning unit, manual means for moving said driving member, means for moving said driving member to a pedetermined position, means for coupling one of said two driving means at a time to said driving member, and means associated with said second named linkage means for variably regulating the speed of travel of said indicator relative to the movement of said tuning unit.

5. In electrical apparatus comprising a movable tuning unit, in combination, a driving member for moving said tuning unit, connecting means for coupling said member to said tuning unit, means for indicating the relative position of said tuning unit, connecting means for coupling said indicating means to said driving member to produce simultaneous movement of said indicating means and said tuning unit, means for moving said driving member, and wear-compensating means between each of said connecting means and said driving member.

6. In electrical apparatus comprising a movable tuning unit, in combination, a driving member for moving said tuning unit, linkage means for coupling said member to said tuning unit, means for indicating the relative position of said tuning unit, linkage means for coupling said indicating means to said driving member to produce simultaneous movement of said indicating means and said tuning unit, and means for moving said driving member.

7. In electrical apparatus having a movable tuning unit, a driving member for moving said tuning unit, connecting means for coupling said member to said tuning unit, means for indicating the relative position of said tuning unit, connecting means for coupling said indicating means to said driving member to produce simultaneous movement of said indicating means and said tuning unit, and means for moving said driving member, wear-compensating means between each of said connecting means and said driving member, said wear-compensating means each including a tapered pivot pin and a spring means about said pin at all pivot pin junctions between each of said connecting means and said driving member.

8. In electrical apparatus comprising a movable tuning unit, in combination, a driving member for moving said tuning unit, connecting means for coupling said member to said tuning unit, means for indicating the relative position of said tuning unit, connecting means for coupling said indicating means to said driving member to produce simultaneous movement of said indicating means and said tuning unit, means for moving said driving member, each of said connecting means including a plurality of levers and links, and wear-compensating means for pivotally joining the respective links and levers together.

9. In electrical apparatus having a movable tuning unit, a driving member for moving said tuning unit, connecting means for coupling said member to said tuning unit, means for indicating the relative position of said tuning unit, connecting means for coupling said indicating means to said driving member to produce simultaneous movement of said indicating means and said tuning unit, and means for moving said driving member, each of said connecting means including a plurality of levers and links, wear-compensating means for pivotally joining the respective links and levers together, said wear-compensating means each including a tapered pivot pin and spring means about said pin at all pivot junctions between the said links and levers.

10. In electrical apparatus comprising a movable tuning unit, in combination, a driving member for moving said tuning unit, linkage means for coupling said member to said tuning unit, means for indicating the relative position of said tuning unit, linkage means for coupling said indicating means to said driving member to produce simultaneous movement of said indicating means and said tuning unit, means for moving said driving member, means associated with said last-named linkage means for variably regulating the speed of movement of said indicator means relative to the movement of said tuning unit, and means for simultaneously changing the ratio of the movement between said last-named means and the movements of said tuning unit and said indicating means.

11. In electrical apparatus comprising a movable tuning unit, in combination, a driving member for moving said tuning unit, connecting means for coupling said member to said tuning unit, means for indicating the relative position of said tuning unit, connecting means for coupling said indicating means to said driving member, manual means for moving said driving member, clutch means for coupling said manual means means to said driving member for manual operation, and release means operating on said clutch means for uncoupling the said manual means from said driving member, and means operable while said manual means is uncoupled for moving said driving member to a predetermined setting.

12. In a device as per claim 11, in which said means operable when said manual means is uncoupled comprises a rotatable member, linkage means connecting said rotatable member with said driving member, and a plunger operated cam for rotating said rotatable member over a predetermined angle of rotation.

13. In a device as per claim 11 in which said means operable when said manual means is uncoupled comprises a rotatable member coupled to said driving member, and an adjustable cam adapted to engage with said rotatable member and rotate the latter over a predetermined angle of rotation.

14. In a device as per claim 11 in which said means operable when said manual means is uncoupled comprises a rotatable member coupled to said driving member and a plurality of plunger-operated cams, each adapted to rotate said rotatable member over a predetermined adjustable angle of rotation.

15. In electrical apparatus comprising a movable tuning unit, in combination, a driving member for moving said tuning unit, connecting means for coupling said member to said tuning unit, means for indicating the relative position of said tuning unit, connecting means for coupling said indicating means to said driving member to produce simultaneous movement of said indicating means and said tuning unit, means for moving said driving member, and means associated with said second named connecting means for variably regulating the speed and distance of movement of said indicator means relative to the movement of said tuning unit.

JOHN D. LINDSAY.
EDWARD J. WIGGINS.
JOHN A. PRESS.

DISCLAIMER 2,188,136.—*John D. Lindsay*, Wilmette, and *Edward J. Wiggins* and *John A. Press*, Chicago, Ill. VISUAL TUNING INDICATOR. Patent dated January 23, 1940. Disclaimer filed October 20, 1942, by the assignee, *American Emblem Company, Inc.*

Hereby enters this disclaimer to claims 11 and 14 of said Letters Patent.

[*Official Gazette November 24, 1942.*]